(12) United States Patent
Bauer et al.

(10) Patent No.: US 10,661,228 B2
(45) Date of Patent: *May 26, 2020

(54) CONTACT-FREE THERMOFORMING OF FIBER BUNDLES

(71) Applicant: GAMBRO LUNDIA AB, Lund (SE)

(72) Inventors: Ulrich Bauer, Hechingen (DE); Franz Baumeister, Hechingen (DE)

(73) Assignee: Gambro Lundia AB, Lund (SE)

( * ) Notice: Subject to any disclaimer, the term of this patent is extended or adjusted under 35 U.S.C. 154(b) by 196 days.

This patent is subject to a terminal disclaimer.

(21) Appl. No.: 15/765,601

(22) PCT Filed: Sep. 22, 2016

(86) PCT No.: PCT/EP2016/072487
§ 371 (c)(1),
(2) Date: Apr. 3, 2018

(87) PCT Pub. No.: WO2017/060094
PCT Pub. Date: Apr. 13, 2017

(65) Prior Publication Data
US 2019/0076785 A1   Mar. 14, 2019

(30) Foreign Application Priority Data

Oct. 6, 2015 (EP) .................................. 15188520

(51) Int. Cl.
*B01D 63/02* (2006.01)
*B01D 61/18* (2006.01)
*B01D 69/08* (2006.01)

(52) U.S. Cl.
CPC .......... *B01D 63/022* (2013.01); *B01D 61/18* (2013.01); *B01D 63/021* (2013.01);
(Continued)

(58) Field of Classification Search
CPC .... B01D 61/18; B01D 63/021; B01D 63/022; B01D 63/024; B01D 69/08;
(Continued)

(56) References Cited

U.S. PATENT DOCUMENTS 5,286,324 A   2/1994  Kawai et al.
5,286,394 A * 2/1994  Moore ................ C10M 133/16
                                                    508/399
(Continued)

FOREIGN PATENT DOCUMENTS

DE   102010024976 A1 * 5/2011 ........... B01D 63/022
DE   102010024976      12/2011
(Continued)

OTHER PUBLICATIONS

PCT Search Report and Written Opinion for PCT/EP2016/072487, completed Dec. 16, 2016.

*Primary Examiner* — James C Goloboy
(74) *Attorney, Agent, or Firm* — Barnes & Thornburg LLP

(57) ABSTRACT

The present disclosure relates to processes for the production of capillary dialyzers. The processes involve contact-free thermoforming of bundles of hollow fiber membranes. The present disclosure also relates to an apparatus for contact-free thermoforming of bundles of hollow fiber membranes.

14 Claims, 4 Drawing Sheets

(52) U.S. Cl.
CPC .......... *B01D 63/024* (2013.01); *B01D 69/08* (2013.01); *B01D 2313/025* (2013.01); *B01D 2313/04* (2013.01); *B01D 2313/08* (2013.01); *B01D 2313/10* (2013.01); *B01D 2313/20* (2013.01)

(58) Field of Classification Search
CPC .......... B01D 2313/025; B01D 2313/04; B01D 2313/08; B01D 2313/10; B01D 2313/20
See application file for complete search history.

(56) References Cited

U.S. PATENT DOCUMENTS

| | | | |
|---|---|---|---|
| 10,369,523 B2 * | 8/2019 | Bauer | B01D 63/021 |
| 2004/0183228 A1 * | 9/2004 | Stillig | B01D 63/021 264/261 |

FOREIGN PATENT DOCUMENTS

| | | |
|---|---|---|
| EP | 1744593 | 1/2007 |
| JP | H0557155 | 3/1993 |
| JP | H0571058 | 3/1993 |
| JP | 2004066575 | 3/2004 |
| WO | WO2001/005449 | 1/2001 |

\* cited by examiner

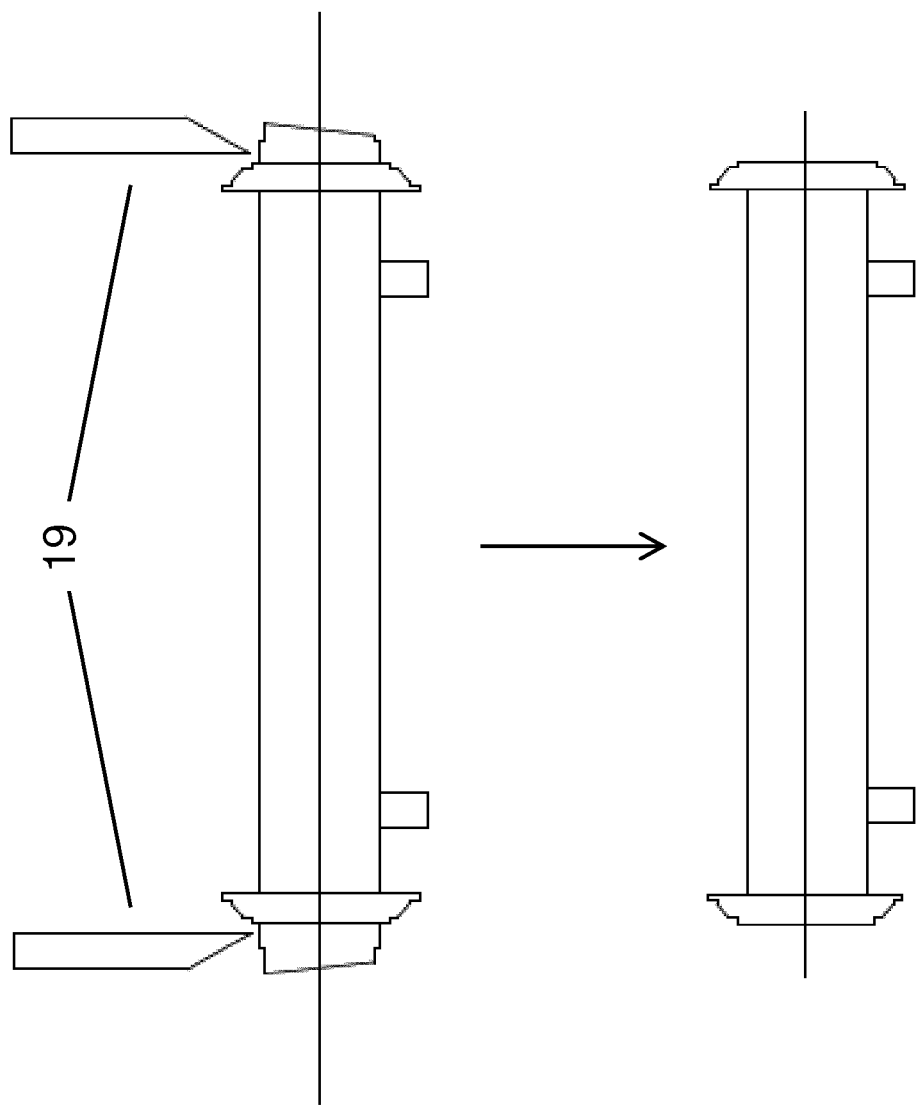

CONTACT-FREE THERMOFORMING OF FIBER BUNDLES

CROSS-REFERENCE TO RELATED APPLICATIONS

This application is the U.S. national phase of PCT/EP2016/072487, filed on Sep. 22, 2016, which claims the benefit of European Patent Application Serial Number 15188520.9, filed on Oct. 6, 2015, the entire disclosures of both of which are incorporated herein by reference.

TECHNICAL FIELD

The present disclosure relates to processes for the production of capillary dialyzers. The processes involve contact-free thermoforming of bundles of hollow fiber membranes. The present disclosure also relates to an apparatus for contact-free thermoforming of bundles of hollow fiber membranes.

DESCRIPTION OF THE RELATED ART

U.S. Pat. No. 4,341,005 A discloses a process for the production of hollow fiber fluid fractionation cells which involves placing a series of half sections of the longitudinal walls of the cell on the periphery of a winding wheel; winding fluid-filled permeable hollow fibers thereabout until the section is full or slightly over-full; placing another mating half shell over each fiber-filled section on the wheel and assembling the cell core; cutting the courses between each section and draining the fluid therefrom; putting an initial fluid potting compound about the courses of fibers and centrifugally casting the potting compound about the fibers at each end of the cell; and cutting the fibers at each end within the area of the potting compound to re-expose the hollow cores thereof.

JP 2003/062433 A discloses a method for manufacturing a hollow fiber membrane module capable of efficiently performing the potting of the end part of a hollow fiber membrane bundle without infiltrating a potting agent into the hollow fiber membranes. In this manufacturing method, the hollow fiber membrane bundle is inserted into the cylindrical case so that the end part thereof protrudes from the cylindrical case; the end part is collapsed and sealed to be potted to the opening of the cylindrical case; and the collapsed and sealed part is subsequently cut off.

WO 2004/086554 A2 discloses a method and apparatus for manufacturing hollow fiber membrane filters which employs a non-contact heat source to melt the tips of the hollow fibers to prevent potting material from entering the fibers. A hot plate is moved into position opposite and very close to the ends of the fibers in a bundle and closed in on the face of the fiber bundle to melt the ends of all the fibers in the bundle and seal them.

SUMMARY

The present disclosure provides processes for the production of capillary dialyzers comprising a bundle of hollow fiber membranes. The processes involve melting together fibers on a perimeter of an end of a fiber bundle so that a contiguous annular zone is formed on the perimeter of the bundle. The melting is effected by radiation heating of a circumference of an end of the fiber bundle.

BRIEF DESCRIPTION OF THE DRAWINGS

FIG. 4 schematically shows cutting of the ends of the thermoformed fiber bundle.

DETAILED DESCRIPTION

A process for the production of capillary dialyzers involves feeding dry hollow fibers to a winding wheel and winding these in sleeve lower parts arranged on the outer circumference of the winding wheel by turning the wheel. As soon as the desired fiber bundle thickness or fiber bundle size has been reached, the winding wheel is stopped and the sleeve upper parts are placed on the sleeve lower parts and fixed there. Subsequently, the hollow fibers are cut between the sleeves (11); and the sleeves (11) containing a fiber bundle (10) are removed from the winding wheel.

Figure 3:
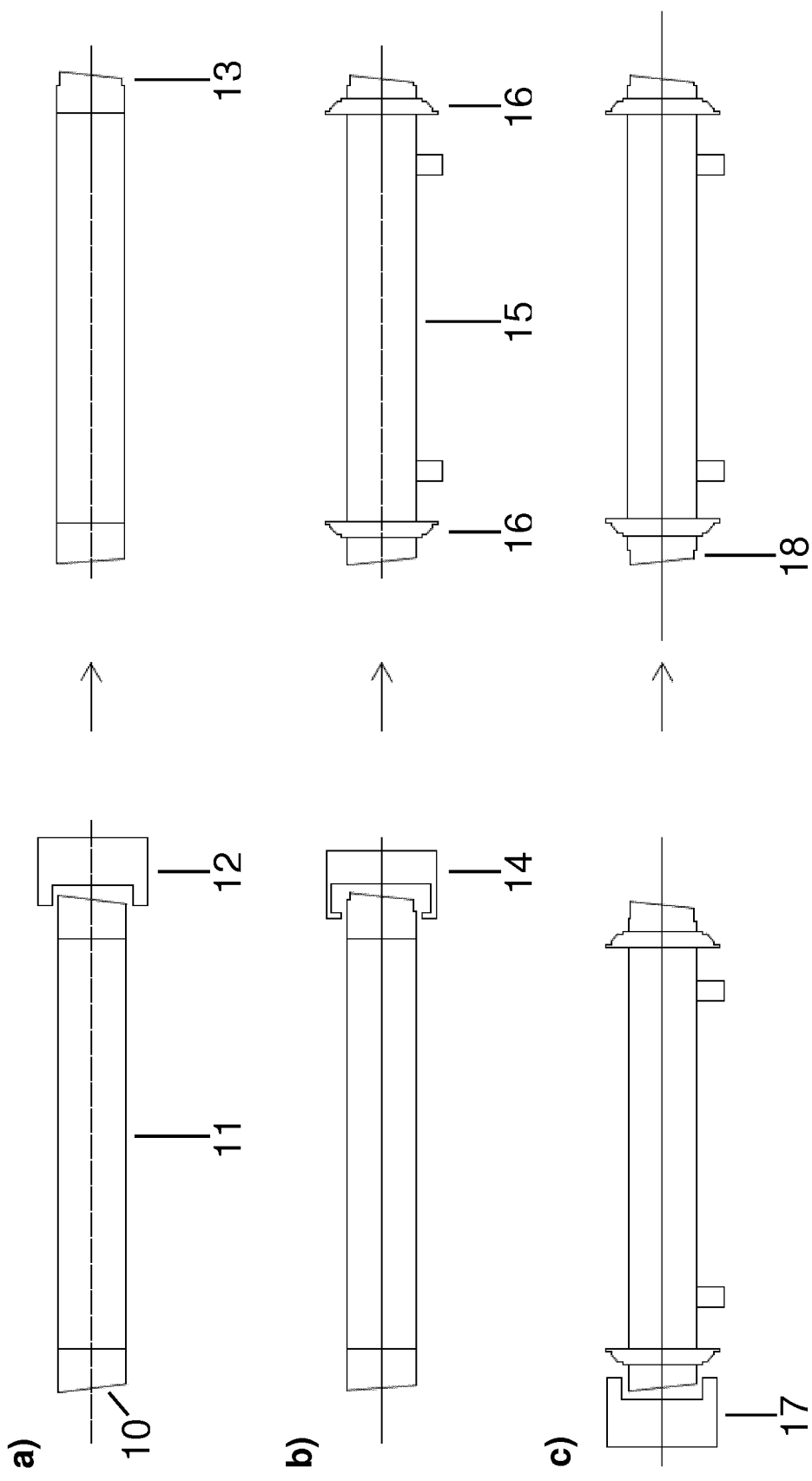
FIG. 3 schematically shows individual steps of the process of the present disclosure:
  a) thermoforming of one end of a fiber bundle;
  b) transfer of the fiber bundle into a tubular filter casing;
  c) thermoforming of the second end of a fiber bundle.

In the process of the present disclosure, prior to transfer of a fiber bundle (10) from a sleeve (11) into a tubular filter casing (15), the fibers on the perimeter of a first end of the fiber bundle (10) are melted together (this operation is subsequently referred to as "thermoforming") so that a contiguous annular zone (13) is formed on a perimeter of the fiber bundle (10) (FIG. 3a). The melting is effected by radiation heating of a circumference of the first end of the fiber bundle. As the heating radiation source does not touch the fiber bundle (10) during the thermoforming step, the process is referred to as "contact-free thermoforming" in the present disclosure.

It is a characteristic feature of the process of the present disclosure that a contiguous annular zone (13) is formed on a perimeter of the fiber bundle (10). Within the area of the bundle end face framed by the contiguous annular zone (13), the fibers remain unchanged, i.e., their ends are not melted and the fibers remain open. Thermoforming thus is clearly distinct from prior art heat-sealing processes such as the process disclosed by WO 2004/086554 A2, or heat-sealing of the fiber ends by a hot blade or hot wire, which produce a disc-shaped fused zone on an end face of the fiber bundle.

The contiguous annular zone (13) of the fiber bundle (10) simplifies transfer of the fiber bundle (10) into the tubular casing (15). As the position of the fiber ends on the perimeter of the bundle is fixed, and no fibers protrude from the perimeter of the bundle, formation of kinks and loops is avoided. Additionally, the transfer tool (14) does not need to engage all fibers on the perimeter. When the diameter of the contiguous annular zone (13) is smaller than the initial diameter of the fiber bundle (10), and also smaller than the inner diameter of the tubular casing (15), the transfer is further facilitated, as less force is necessary to pull the fiber bundle (10) into the tubular casing (15). This in turn reduces the risk of fibers rupturing during the transfer of the fiber bundle. Both factors result in reduction of scrap.

In one embodiment of the process, thermoforming is also performed on the second end of the fiber bundle (10). A thermoforming tool comprising a radiation source (17) produces a contiguous annular zone (18) on the perimeter of the second end of the fiber bundle (10) (FIG. 3c).

In one embodiment of the process, the diameter of the fiber bundle (10) is reduced to from 70 to 90% of its initial value in the contiguous annular zone (13, 18) (the thermoformed zone) during thermoforming.

In one embodiment, the contiguous annular zone (13, 18) produced by the thermoforming process has a thickness, in radial direction of the bundle, of 0.1 to less than 1 mm, and a length of 2 to 20 mm in longitudinal (i.e., axial) direction of the bundle.

In the process of the present disclosure, thermoforming is effected by radiation heating. The circumference of an end of a fiber bundle (10) is irradiated with a suitable radiation source (12, 17) which produces, for instance, microwave, UV, or IR radiation. In one embodiment of the process, IR radiation is used to effect thermoforming.

In one embodiment of the process, the radiation source (12, 17) has a power in the range of from 1000 to 2500 W, for instance, from 1500 to 2000 W.

In one embodiment of the process, the circumference of an end of a fiber bundle (10) is irradiated for a time in the range of from 1 sec to 20 seconds, for instance, 3 to 15 seconds, particularly 5 to 10 seconds, to produce a contiguous annular zone (13, 18).

Thermoforming of a first end of a fiber bundle (10) is schematically shown in FIG. 3a. A thermoforming tool comprising a radiation source (12) produces a contiguous annular zone (13) on a perimeter of the first end of the fiber bundle (10). The fiber bundle (10) then is transferred into a tubular filter casing (15) (FIG. 3b). In a preferred embodiment, the tubular filter casing (15) is equipped with potting sleeves (16) at both ends. The length of the fiber bundle (10) is greater than the length of the tubular casing (15), so that both ends of the fiber bundle (10) protrude from the tubular casing (15) after the transfer. In particular, the thermoformed zone (13) of the fiber bundle (10) is entirely outside the tubular casing (15).

In one embodiment of the process, the transfer is carried out by a tool (14), e.g., a transfer claw. The tool (14) reaches through the tubular casing (15); engages the contiguous annular zone (13) on the first end of the bundle (10) of hollow fiber membranes; pulls the bundle (10) of hollow fiber membranes into the tubular casing (15); and continues to pull until the first end of the bundle (10) of hollow fiber membranes inclusive of the entire contiguous annular zone (13) protrudes from the tubular casing (15).

In one embodiment of the process, thermoforming is also performed on the second end of the fiber bundle (10) protruding from the tubular casing (15) after transfer of the fiber bundle (10) into the tubular casing (15) (FIG. 3c). A thermoforming tool comprising a radiation source (17) produces a contiguous annular zone (18) on a perimeter of the second end of the fiber bundle (10).

The portions of the bundle of hollow fiber membranes (10) protruding from the tubular casing (15) are cut off with a cutting tool (19) (FIG. 4) prior to the next stage of the dialyzer production process, which involves the formation of end walls within the tubular casing (15) by embedding the ends of the fiber bundle (10) in a potting material, e.g., polyurethane.

In one embodiment of the process, the end of the fiber bundle (10) is cut off with a blade subsequently to the thermoforming and transfer steps. In another embodiment of the process, the end of the fiber bundle is cut and the fiber ends are heat-sealed with a hot blade or a hot wire subsequently to the thermoforming and transfer steps.

When a thermoformed end of the fiber bundle (10) is cut off, the cut-off forms a contiguous slice, while otherwise a multitude of small fiber pieces is generated. Thus thermoforming also results in less particle generation and less contamination of the workplace and equipment; less maintenance is required in the area where the transfer and cutting steps are performed.

The present disclosure also provides an apparatus for forming a contiguous annular zone (13, 18) on a perimeter of an end of a bundle (10) of hollow fiber membranes (a "thermoforming tool"). The apparatus comprises a radiation source (12, 17) configured to irradiate a circumference of said end of the bundle (10). In one embodiment of the apparatus, the radiation source (12, 17) is an IR emitter. One embodiment of the apparatus employs an IR emitter having the shape of an omega. In one embodiment of the apparatus, the omega has an inner diameter in the range of from 30 to 130 mm, for instance, 60 to 100 mm. Examples of suitable IR emitters include Omega Infrared Emitters available from Heraeus Noblelight GmbH (63801 Kleinostheim, Germany). In a particular embodiment, an Omega Infrared Emitter having an outer diameter of 80 mm and a power of 1500 W is used.

Figure 1:
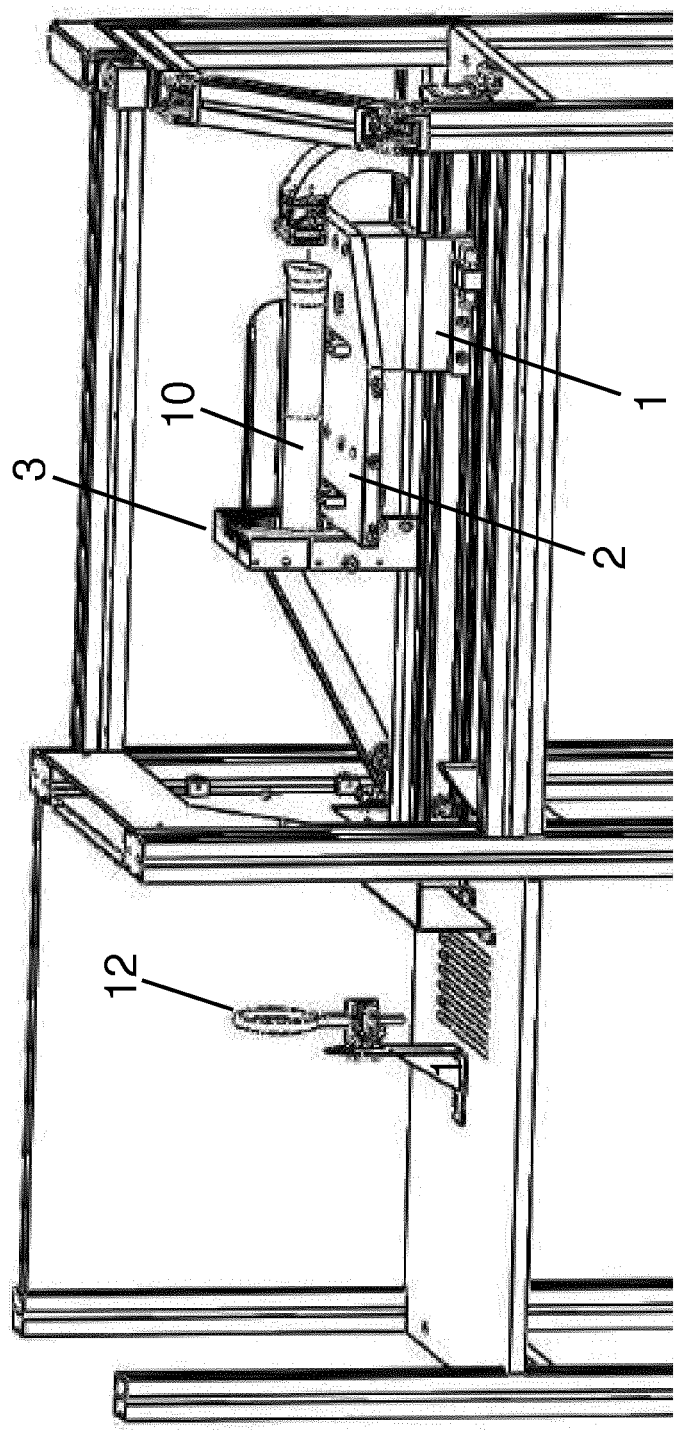
FIG. 1 shows a perspective view of an embodiment of an apparatus for contact-free thermoforming according to the present disclosure including a fiber bundle in the starting position.
Figure 2:
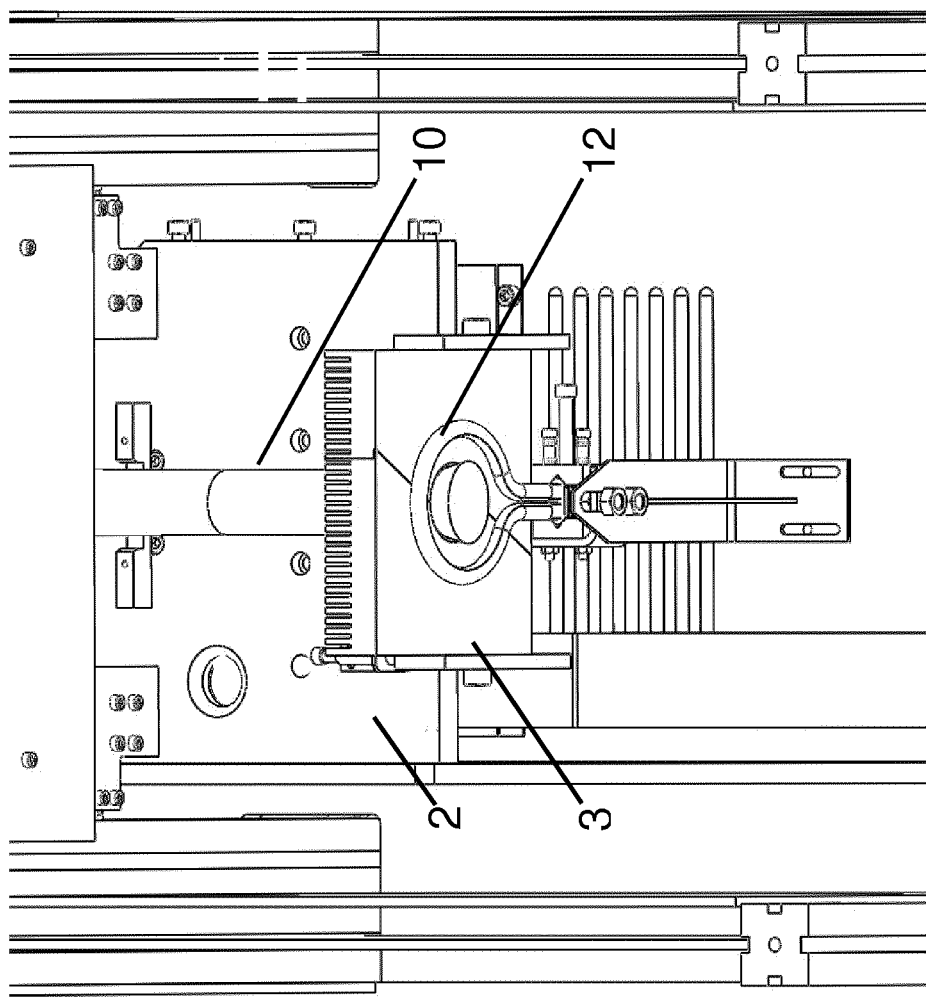
FIG. 2 shows a perspective top view of a detail of the apparatus of FIG. 1 including a hollow fiber bundle in the end position.

An exemplary apparatus for performing contact-free thermoforming is shown in FIGS. 1 and 2. The apparatus comprises a sliding carriage (1) with a tray (2) for mounting the fiber bundle (10). A two-part heat sink (3) is provided for enclosing the fiber bundle (10) at a position near its end. The apparatus comprises a radiation source (12) which is an omega-shaped IR emitter mounted in a fixture in vertical position. The center of the IR emitter is aligned with the longitudinal axis of the fiber bundle (10) on the tray (2).

To form a contiguous annular zone on the perimeter of the fiber bundle (10), the fiber bundle (10) first is mounted on the tray (2) and the heat sink (3) is closed around the fiber bundle (10) at apposition near its end, leaving a portion having a length of 5 mm to 20 mm, for instance, 5 to 15 mm, e.g., 5 to 10 mm, or 10 to 15 mm, to protrude from the heat sink (3). The heat sink (3) is configured to shield the non-protruding portion of the fiber bundle (10) from the radiation emitted by radiation source (12).

The sliding carriage (1) is moved from a starting position (as shown in FIG. 1) into an end position (as shown in FIG. 2) close to the radiation source (12). The fibers on the perimeter of the fiber bundle (10) are melted together, thereby forming a contiguous annular zone on the perimeter of the fiber bundle. The bundle remains in the end position for a time in the range of from 3 to 15 seconds, for instance, 5 to 10 seconds, and then the sliding carriage (1) is moved back into the starting position, the heat sink (3) is opened and the fiber bundle (10) is removed from the tray (2). After transfer of the bundle into a tubular filter casing (15), the procedure can be repeated on the other end of the fiber bundle (10).

It will be understood that the features mentioned above and those described hereinafter can be used not only in the combination specified but also in other combinations or on their own, without departing from the scope of the present invention.

LIST OF REFERENCE SIGNS 1 sliding carriage
2 tray
3 heat sink 10 bundle of hollow fiber membranes
11 sleeve
12 first radiation source
13 thermoformed first end of the fiber bundle
14 transfer tool
15 tubular filter casing
16 potting sleeve
17 second radiation source
18 thermoformed second end of the fiber bundle
19 cutting tool (e.g., blade, hot blade, or hot wire)

The invention claimed is:

1. A process for the production of a capillary dialyzer comprising a bundle of hollow fiber membranes disposed within a tubular casing, the process comprising, prior to transfer of the bundle of hollow fiber membranes into the tubular casing, forming a contiguous annular zone on a perimeter of a first end of a bundle of hollow fiber membranes by melting together the fibers on the perimeter of the bundle of hollow fiber membranes while the fibers within the area of the bundle end face framed by the contiguous annular zone remain unchanged, wherein the melting is effected by irradiation.

2. The process of claim 1, wherein the contiguous annular zone has a radial thickness of about 0.1 to less than about 1 mm.

3. The process of claim 1, wherein the contiguous annular zone has a length of about 2 to about 15 mm in longitudinal direction of the bundle.

4. The process of claim 1, wherein the diameter of the fiber bundle is reduced to from about 70 to about 90% of its initial value in the contiguous annular zone.

5. The process of claim 1, wherein the transfer is effected by a tool reaching through the tubular casing; engaging the contiguous annular zone on the first end of the bundle of hollow fiber membranes; pulling the bundle of hollow fiber membranes into the tubular casing; and continuing to pull until the first end of the bundle of hollow fiber membranes inclusive of the entire contiguous annular zone protrudes from the tubular casing.

6. The process of claim 1, wherein a second contiguous annular zone is formed on a perimeter of a second end of the bundle of hollow fiber membranes subsequent to transfer of the bundle of hollow fiber membranes into the tubular casing.

7. The process of claim 5, wherein both ends of the bundle of hollow fiber membranes protrude from the tubular casing after the transfer; and the portions of the bundle of hollow fiber membranes protruding from the tubular casing are subsequently cut off.

8. The process of claim 7, wherein, simultaneously with cutting off the portions of the bundle of hollow fiber membranes protruding from the tubular casing, the ends of the fibers of the bundle of hollow fiber membranes are heat-sealed.

9. The process of claim 8, wherein cutting off and heat-sealing are performed with a hot blade or a hot wire.

10. The process of claim 2, wherein the contiguous annular zone has a length of about 2 to about 15 mm in longitudinal direction of the bundle.

11. The process of claim 2, wherein the diameter of the fiber bundle is reduced to from about 70 to about 90% of its initial value in the contiguous annular zone.

12. The process of claim 3, wherein the diameter of the fiber bundle is reduced to from about 70 to about 90% of its initial value in the contiguous annular zone.

13. The process of claim 6, wherein both ends of the bundle of hollow fiber membranes protrude from the tubular casing after the transfer; and the portions of the bundle of hollow fiber membranes protruding from the tubular casing are subsequently cut off.

14. The process of claim 13, wherein, simultaneously with cutting off the portions of the bundle of hollow fiber membranes protruding from the tubular casing, the ends of the fibers of the bundle of hollow fiber membranes are heat-sealed.

* * * * *